US012679987B2

(12) United States Patent
Ohno

(10) Patent No.: US 12,679,987 B2
(45) Date of Patent: Jul. 14, 2026

(54) ACTIVE RAY CURABLE INKJET INK

(71) Applicant: Konica Minolta, Inc., Tokyo (JP)

(72) Inventor: Yohei Ohno, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 243 days.

(21) Appl. No.: 18/744,491

(22) Filed: Jun. 14, 2024

(65) Prior Publication Data

US 2025/0002737 A1 Jan. 2, 2025

(30) Foreign Application Priority Data

Jun. 20, 2023 (JP) ................................ 2023-100416

(51) Int. Cl.
*C09D 11/38* (2014.01)
*C09D 11/322* (2014.01)
*C09D 11/40* (2014.01)

(52) U.S. Cl.
CPC ............ *C09D 11/38* (2013.01); *C09D 11/322* (2013.01); *C09D 11/40* (2013.01)

(58) Field of Classification Search
CPC ............ B41J 11/00212; B41J 11/00214; B41J 2/447; B41M 7/0081; C09D 11/101; C09D 11/102; C09D 11/30; C09D 11/322; C09D 11/324; C09D 11/326; C09D 11/38; C09D 11/40; C09D 11/54
See application file for complete search history.

(56) References Cited

U.S. PATENT DOCUMENTS

| | | | | |
|---|---|---|---|---|
| 8,888,262 | B2 * | 11/2014 | Maeda | C09D 11/322 347/100 |
| 9,499,703 | B2 * | 11/2016 | Kaga | B41M 5/0023 |
| 9,528,018 | B2 * | 12/2016 | Yazaki | C09D 11/12 |
| 2013/0141505 | A1 * | 6/2013 | Ikeda | C09D 11/40 522/31 |
| 2013/0230701 | A1 * | 9/2013 | Mochizuki | C09D 11/30 522/16 |
| 2017/0028759 | A1 * | 2/2017 | Takaku | B41J 11/00214 |

FOREIGN PATENT DOCUMENTS

JP 2013-181163 A 9/2013

* cited by examiner

*Primary Examiner* — Anh T Vo
(74) *Attorney, Agent, or Firm* — LUCAS & MERCANTI, LLP

(57) ABSTRACT

An active ray curable inkjet ink includes an active ray polymerizable compound, a photopolymerization initiator, a polymer compound, and a gelling agent. The polymer compound has a tolylene diisocyanate structure.

7 Claims, 2 Drawing Sheets

ACTIVE RAY CURABLE INKJET INK

CROSS-REFERENCE TO RELATED APPLICATIONS

The entire disclosure of Japanese Patent Application No. 2023-100416, filed on Jun. 20, 2023, including description, claims, drawings and abstract is incorporated herein by reference.

BACKGROUND OF THE INVENTION

Technical Field

The present invention relates to an active ray curable inkjet ink. The present invention particularly relates to an active ray curable inkjet ink that can inhibit gloss unevenness due to precipitation of a gelling agent on the surface of an image after the ink lands on a base material from occurring and has excellent image definition.

Description of Related Art

Inkjet image forming methods are used in various printing fields because images can be formed easily and inexpensively. As one of inkjet image forming methods, there is an active ray curable inkjet image forming method of, after making droplets of active ray curable inkjet ink land on a recording medium, irradiating the droplets with active rays to cure the droplets, thereby forming an image.

The active ray curable inkjet image forming method has been attracting attention in recent years because images having high scratch resistance and adhesiveness can be formed even on recording media having no ink absorbency.

As an active ray curable ink used in such an image forming method, a technology is disclosed in Japanese Unexamined Patent Publication No. 2013-181163.

SUMMARY OF THE INVENTION

However, since the ink disclosed in Japanese Unexamined Patent Publication No. 2013-181163 does not contain a gelling agent, there is a problem that when the ink lands on a base material, ink dots wetly spread, so that image definition is poor.

Therefore, in general, an active ray curable ink containing a gelling agent is used. However, an image formed with an active ray curable inkjet ink containing a gelling agent may suffer from gloss unevenness (blooming) due to precipitation of the gelling agent on the image surface.

The present invention has been made in consideration of the above-mentioned problems and situations. Objects of the present invention include providing an active ray curable inkjet ink that can inhibit gloss unevenness due to precipitation of a gelling agent on the surface of an image after the ink lands on a base material from occurring and have excellent image definition.

To achieve at least one of the objects, the present inventor has studied causes of the above problem and the like. As a result, the present inventor has found that when a gelling agent and a polymer compound having a tolylene diisocyanate structure are contained in an active ray curable inkjet ink, the gelling agent can be prevented from precipitating on the image surface. In addition, by containing the gelling agent, the image definition is also excellent.

That is, the object(s) according to the present invention is achieved by the following means.

To achieve at least one of the abovementioned objects, according to an aspect of the present invention, an active ray curable inkjet ink reflecting one aspect of the present invention includes: an active ray polymerizable compound; a photopolymerization initiator; a polymer compound; and a gelling agent, wherein the polymer compound has a tolylene diisocyanate structure.

BRIEF DESCRIPTION OF THE DRAWINGS

The advantages and features provided by one or more embodiments of the invention will become more fully understood from the detailed description given hereinafter and the appended drawings which are given by way of illustration only, and thus are not intended as a definition of the limits of the present invention, and wherein.

DETAILED DESCRIPTION

Figure 1A:
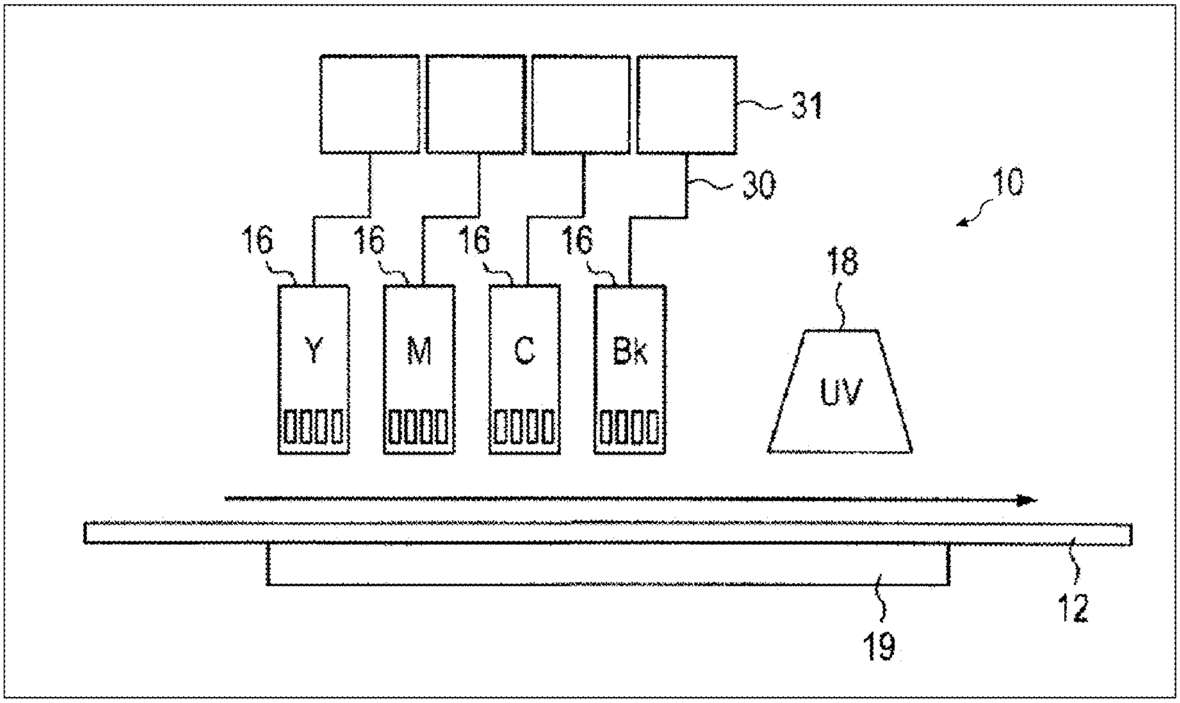
FIG. 1A is a diagram illustrating an example of a configuration of a main portion of an inkjet recording apparatus of a line recording method.

Hereinafter, one or more embodiments of the present invention will be described with reference to the drawings. However, the scope of the invention is not limited to the disclosed embodiments.

The active ray curable inkjet ink of the present invention is an active ray curable inkjet ink including an active ray polymerizable compound, a photopolymerization initiator, a polymer compound and a gelling agent, wherein the polymer compound has a tolylene diisocyanate structure.

This feature is a technical feature common to or corresponding to each embodiment below.

The above-described means of the present invention can provide an active ray curable inkjet ink that can prevent gloss unevenness due to precipitation of a gelling agent on the surface of an image after the ink lands on a base material from occurring and have excellent image definition.

The expression mechanism or action mechanism of the advantageous effects of the present invention is not clear, but it is presumed as follows.

Note that hereinafter, the term "active ray curable inkjet ink" may be referred to simply as "ink".

The ink of the present invention contains a gelling agent in addition to an active ray polymerizable compound, a photopolymerization initiator and a polymer compound, and the polymer compound has a tolylene diisocyanate structure. Thus, the compatibility between the polymer compound having a tolylene diisocyanate structure and the gelling agent is increased. Therefore, the gelling agent can be prevented from precipitating on the surface of the image after the ink lands on the base material. As a result, gloss unevenness (blooming) can be reduced, and an image having excellent quality is obtained.

In addition, since the gelling agent is contained, when the ink lands on the base material, the ink dot does not wetly spread, and the image definition is excellent.

In an embodiment of the present invention, the polymer compound is preferably a polymer compound having an ε-caprolactam structure, in view of excellent compatibility with the gelling agent.

The content of the polymer compound is preferably greater than 0% by mass and 5% by mass or less from the viewpoint of excellent compatibility with the gelling agent.

The weight average molecular weight Mw of the polymer compound is preferably within a range of 5,000 to 15,000 from the viewpoint that the dispersion of the polymer dispersant at the time of ink preparation becomes satisfactory.

The number average molecular weight Mn of the polymer compound is preferably within a range of 5,000 to 10,000 from the viewpoint that the dispersion of the polymer dispersant at the time of ink preparation becomes satisfactory.

It is preferable to contain a pigment from the viewpoint of the storage stability of the ink.

It is preferable that the gelling agent is an aliphatic ketone compound or an aliphatic ester compound, from the viewpoint that an image becomes highly precise.

Hereinafter, the present invention and constituent elements thereof, and modes and aspects for carrying out the present invention will be described. In the present description, numerical values before and after "to" are used as the lower limit value and the upper limit value.

[Outline of Active Ray Curable Inkjet Ink of Present Invention]

The active ray curable inkjet ink of the present invention is an active ray curable inkjet ink including an active ray polymerizable compound, a photopolymerization initiator, a polymer compound and a gelling agent, wherein the polymer compound has a tolylene diisocyanate structure.

The ink of the present invention is an ink that can be cured by active ray(s).

The "active rays" may be accurately referred to as "active energy rays". In addition, the active rays are rays which can impart energy to generate a reaction initiating species in the ink by the irradiation, and include X-rays and ultraviolet rays. Among these, ultraviolet rays are more preferable from the viewpoints of curing sensitivity and availability of an apparatus.

[Configuration of Ink]

<Gelling Agent>

The ink of the present invention contains a gelling agent.

The gelling agent imparts a function of causing the ink to undergo a sol-gel phase transition reversibly depending on temperature. Such a gelling agent is required to at least (1) dissolve in the active ray polymerizable compound at a temperature higher than the gelation temperature, and (2) crystallize in the ink at a temperature equal to or lower than the gelation temperature.

It is preferable that, when the gelling agent is crystallized in the ink, plate crystals that are a crystallized product of the gelling agent form a three dimensionally enclosing space, and the space include an active ray curable compound. Such a structure in which an active ray curable compound is included in a space three dimensionally surrounded by plate crystals may be referred to as a "card house structure".

When the card house structure is formed, the liquid active ray curable compound can be held, and the ink droplets can be pinned, whereby the coalescence of the droplets can be suppressed. In order to form the card house structure, the active ray polymerizable compound and the gelling agent dissolved in the ink are preferably compatible with each other. In contrast, when the active ray polymerizable compound and the gelling agent dissolved in the ink are phase-separated, it may be difficult to form the card house structure.

In order to stably discharge ink droplets from an inkjet recording apparatus, it is necessary that the compatibility between the active ray polymerizable compound and the gelling agent is good in a sol-like ink (at a high temperature). Furthermore, in order to stably inhibit coalescence of liquid droplets even during high-speed printing, it is necessary that the gelling agent crystallizes quickly after the ink droplets land on a recording medium, thereby forming a strong card house structure.

As such a gelling agent, an aliphatic ketone compound or an aliphatic ester compound is preferably contained.

The gelling agent that is an aliphatic ketone compound is a compound represented by the following General Formula (G1).

$R_1$—CO—$R_2$ General formula (G1):

In General Formula (G1), $R_1$ and $R_2$ are each independently an alkyl group including a straight-chain portion having a carbon number of 9 to 25.

The alkyl group may be an alkyl group having an unsaturated group as a substituent, but from the viewpoint of increasing the gelation temperature or the like, it is preferably an alkyl group having no unsaturated group.

When the alkyl groups of $R_1$ and $R_2$ have about the same carbon number, the melting point of a compound in which $R_1$ and $R_2$ are saturated alkyl groups is often higher than the melting point of a compound in which $R_1$ and $R_2$ are alkyl groups having an unsaturated group, and the gelation temperature also tends to be high.

The alkyl group may be a linear alkyl group, a branched alkyl group, or a cyclic alkyl group, but is preferably a linear alkyl group in order to obtain high crystallinity.

When the carbon number of the linear portion included in the alkyl group is 9 or more and 25 or less, it is possible to form the card house structure described above while having crystallinity necessary as the gelling agent. In addition, the melting point does not become too high, and the aliphatic ketone compound is dissolved in the ink even when the ejection temperature of the ink is not increased.

The carbon number of the linear portion included in the alkyl group of $R_1$ and $R_2$ is preferably 11 or more and less than 23. Therefore, $R_1$ and $R_2$ are particularly preferably a linear alkyl group having a carbon number of 11 or more and less than 23.

Examples of the alkyl group containing a linear portion having a carbon number of 9 or more and 25 or less include a docosanyl group (C22), a henicosanyl group (C21), an icosanyl group (C20), and an octadecanyl group (stearyl group, C18). Examples of the alkyl group containing a linear portion having a carbon number of 9 or more and 25 or less include a heptadecanyl group (C17), a hexadecanyl group (palmityl group, C16), and a pentadecanyl group (C15). Examples of the alkyl group containing a linear portion having a carbon number of 9 or more and 25 or less include a tetradecanyl group (myristyl group, C14), a tridecanyl group (C13), a dodecanyl group (lauryl group, C12), an undecanyl group (C11), and a decanyl group (C10).

Examples of the compound represented by General Formula (G1) include dibehenyl ketone (C22-C22), distearyl ketone (19-heptatriacontanone, C18-C18), dipalmityl ketone (C16-C16), dilauryl ketone (C12-C12), 25-nonatetracontanone (C24-C24), diheneicosanyl ketone (22-tritetracontanone, C21-C21, melting point 88° C.), diheptadecyl ketone (18-pentatriacontanone, C17-C17, melting point 84° C.), 21-hentetracontanone (C20-C20), dipentadecyl ketone (16-hentriacontanone, C15-C15, melting point 80° C.), 14-heptacosanone (C13-C13), diundecyl ketone (12-tricosanone, C11-C11, melting point 68° C.), 11-hepcosanone (C10-C10), 13-heptacosanone (C12-C14), 13-nonacosanone (C12-C16), 13-hentriacontanone (C12-C18), 13-pentatriacontanone (C12-C22), 15-hentriacontanone (C14-C16), 15-propatriacontanone (C14-C18), 15-heptatriacontanone (C14-C22), 17-heptatriacontanone (C16-C18), 17-nonatriacontanone (C16-C22), and 19-hentetracontane (C18-C22), and preferably diheptadecyl ketone (C17-C17).

Examples of commercially available products of the compound represented by General Formula (G1) include 18-Pentatriacontanon (manufactured by AlfaAeser), Hentriacontan-16-on (manufactured by AlfaAeser), and KAO WAX T1 (manufactured by Kao Corp.). These commercially available products are often mixtures of two or more kinds, and therefore may be used after separation and/or purification, if necessary.

The aliphatic ketone compound may be one type of compound represented by General Formula (G1) or a mixture of two or more types of compound represented by General Formula (G1).

The gelling agent that is an aliphatic ester compound is a compound represented by the following General Formula (G2).

$R_3$—COO—$R_4$ General formula (G2):

In General Formula (G2), $R_3$ and $R_4$ are each independently an alkyl group including a straight-chain portion having a carbon number of 9 to 26. The alkyl group may be a saturated or unsaturated alkyl group, but is preferably a saturated alkyl group.

The alkyl group may be a linear alkyl group, a branched alkyl group, or a cyclic alkyl group, but is preferably a linear alkyl group in order to obtain high crystallinity.

When the carbon number of the linear portion included in the alkyl group of $R_3$ and $R_4$ is 9 to 26, similarly to the compound represented by General Formula (G1), it is possible to form the card house structure described above and not to make the melting point too high while having crystallinity necessary as the gelling agent.

In order to increase the crystallinity of the compound represented by General Formula (G2), the carbon number of the linear portion included in the alkyl group of $R_3$ is preferably 11 or more and less than 23, and the carbon number of the linear portion included in the alkyl group of $R_4$ is preferably 12 or more and less than 24. Therefore, $R_3$ is particularly preferably a linear alkyl group having a carbon number of 11 or more and less than 23, and $R_4$ is particularly preferably a linear alkyl group having a carbon number of 12 or more and less than 24.

Examples of the alkyl group containing a linear portion having a carbon number of 9 or more and 26 or less include the same alkyl groups containing a linear portion having a carbon number of 9 or more and 25 or less in General Formula (G1).

Examples of the compound represented by General Formula (G2) include behenyl behenate (C21-C22, melting point 70° C.), icosyl icosanoate (C19-C20), stearyl stearate (C17-C18, melting point 60° C.), palmityl stearate (C17-C16), lauryl stearate (C17-C12), palmityl palmitate (cetyl palmitate C15-C16, melting point 54° C.), stearyl palmitate (C15-C18), myristyl myristate (C13-C14, melting point 43° C.), cetyl myristate (C13-C16, melting point 50° C.), octyldodecyl myristate (C13-C20), lauryl laurate (C11-C12, melting point 30° C.), cetyl caprate (C9-C16, melting point 30° C.), stearyl oleate (C17-C18), stearyl erucate (C21-C18), stearyl linoleate (C17-C18), and isostearyl palmitate (C15-C18).

Examples of commercially available products of the compound represented by General Formula (G2) include Unista-M-2222SL (manufactured by Nof Corp.), EXCEPARL SS (manufactured by Kao Corp., mp. 60° C.), and EMALEXCC-18 (manufactured by Nihon Emulsion Co., Ltd.). In addition, examples of the commercially available products include AMREPS PC (manufactured by KOKYU ALCOHOL KOGYO CO., LTD.), EXCEPARL MY-M (manufactured by Kao Corp.), SPERMACETI (manufactured by Nof Corp.), and EMALEX CC-10 (manufactured by Nihon Emulsion Co., Ltd.). These commercially available products are often mixtures of two or more kinds, and therefore may be used after separation and/or purification, if necessary.

The aliphatic ester compound may be one type of compound represented by General Formula (G2), or may be a mixture of two types of compound represented by General Formula (G2).

All the compounds of the aliphatic ketone compound group contained in the ink preferably have a melting point of 100° C. or lower. In order to enhance the pinning property of the ink, the melting point is more preferably in a range of 60 to 100° C.

Meanwhile, all the compounds of the aliphatic ester compound group contained in the ink preferably have a melting point of 100° C. or lower. In order to enhance the ejection property of the ink, the melting point is preferably in a range of 30 to 75° C.

As the gelling agent contained in the active ray curable inkjet ink, the aliphatic ketone compound or the aliphatic ester compound may be used alone or in combination of two or more kinds.

The total amount of the aliphatic ketone compound represented by General Formula (G1) and the aliphatic ester compound represented by General Formula (G2) is preferably 0.5% by mass or more and less than 10% by mass with respect to the total mass of the ink. The total amount is more preferably 1% by mass or more and less than 7% by mass.

When the total amount is 0.5 mass % or more, the ink tends to undergo gelation (sol-gel phase transition due to temperature). On the other hand, when the total amount is less than 10% by mass, the aliphatic ketone compound and the aliphatic ester compound can be sufficiently dissolved in the ink, and the ejection property of the ink improves.

The ink of the present invention may further contain another gelling agent, if necessary. Examples of the another gelling agent include a polymer compound and a low molecular weight compound, and the low molecular weight compound is preferable in order to improve the ejection property of the ink.

Examples of the polymer compound as the another gelling agent include fatty acid inulin such as inulin stearate; fatty acid dextrin such as dextrin palmitate and dextrin myristate (such as Rheopearl series by Chiba Flour Milling Co. Ltd.); eicosanedioic acid glyceryl docosanoate, eicosanedioic acid polyglyceryl docosanoate (such as NOMUCOAT series by The Nisshin OilliO Group, Ltd.).

Examples of the low molecular weight compound as the another gelling agent include:

- aliphatic ketone compound other than the compound represented by General Formula (G1);
- aliphatic ester compound other than the compound represented by General Formula (G2);
- low molecular weight oil gelling agents described in Japanese Unexamined Patent Publication No. 2005-126507, Japanese Unexamined Patent Publication No. 2005-255821 and Japanese Unexamined Patent Publication No. 2010-111790;

amide compounds such as N-lauroyl-L-glutamic acid dibutylamide and N-(2-ethylhexanoyl)-L-glutamic acid dibutylamide (available from Ajinomoto Fine-Techno Co., Inc.);

dibenzylidene sorbitols such as 1, 3:2,4-bis-O-benzylidene-D-glucitol (Gelol D, available from New Japan Chemical Co., Ltd.);

petroleum-based waxes such as paraffin wax, microcrystalline wax, and petrolactam; plant-based waxes such as candelilla wax, carnauba wax, rice wax, Japan wax, jojoba oil, jojoba solid wax, and jojoba ester; animal-based waxes such as beeswax, lanolin, and spermaceti; mineral-based waxes such as montan wax, and hydrogenated wax; hydrogenated castor oil or hydrogenated castor oil derivatives; modified waxes such as montan wax derivatives, paraffin wax derivatives, microcrystalline wax derivatives, and polyethylene wax derivatives; higher fatty acids such as docosanoic acid, arachidic acid, stearic acid, palmitic acid, myristic acid, lauric acid, oleic acid, and erucic acid;

higher alcohols such as stearyl alcohol and behenyl alcohol;

hydroxystearic acid such as 12-hydroxystearic acid;

12-hydroxystearic acid derivatives;

fatty acid amides such as lauric acid amide, stearic acid amide, docosanoic acid amide, oleic acid amide, erucic acid amide, ricinoleic acid amide, and 12-hydroxystearic acid amide (e.g., Nikka amide series manufactured by Nihon Kasei CO., LTD., ITOWAX series manufactured by Itoh Oil Chemicals Co., Ltd, and FATTYAMID series manufactured by Kao Corp.);

N-substituted fatty acid amides such as N-stearyl stearic acid amide and N-oleyl palmitic acid amide;

special fatty acid amides such as N, N'-ethylenebisstearylamide, N, N'-ethylenebis 12-hydroxystearylamide, and N, N'-xylylenebisstearylamide;

higher amines such as dodecylamine, tetradecylamine and octadecylamine;

fatty ester compounds such as stearyl stearic acid, oleyl palmitic acid, glycerin-fatty ester, sorbitan-fatty ester, propylene-glycol-fatty ester, ethylene-glycol-fatty ester, and polyoxyethylene-fatty ester (e.g., EMALLEX series manufactured by Nihon Emulsion Co., Ltd., RIKEMAL series manufactured by Riken Vitamin Co., Ltd, and POEM series manufactured by Riken Vitamin Co., Ltd);

sucrose fatty acid esters such as sucrose stearic acid and sucrose palmitic acid (e.g., Ryoto Sugar Ester Series manufactured by Mitsubishi Chemical Foods Corporation);

synthetic waxes such as polyethylene wax and α-olefin-maleic anhydride copolymer wax; polymerizable waxes (e.g., UNILTIN series manufactured by Baker Petrolite Corporation); and dimer acid; and dimer diol (e.g., PRIPOR series manufactured by CRODA).

These gelling agents may be used alone or in combination of two or more kinds thereof.

<Polymer Compound>

The polymer compound according to the present invention has a tolylene diisocyanate structure.

When the polymer compound has a tolylene diisocyanate structure, the structure serves as steric hindrance, so that shrinkage during polymerization can be suppressed.

Furthermore, since the tolylene diisocyanate structure has high compatibility with the gelling agent, it is possible to prevent the gelling agent from precipitating on the surface of an image after the ink lands on a base material. As a result, gloss unevenness (blooming) can be reduced, and an image having excellent quality is obtained.

Examples of the tolylene diisocyanate structure include structures of 2,4-tolylene diisocyanate and 2,6-tolylene diisocyanate shown below.

[Chem. 1]

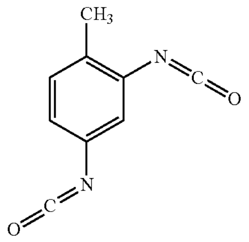

2,4-TOLYLENE DIISOCYANATE

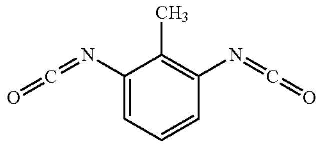

2,6-TOLYLENE DIISOCYANATE

The polymer compound preferably further has an ε-caprolactam structure shown below.

[Chem. 2]

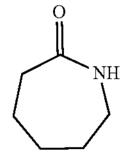

ε-CAPROLACTAM

The polymer compound preferably has a weight average molecular weight (Mw) in the range of 5,000 to 15,000.

Furthermore, the number average molecular weight (Mn) of the polymer compound is preferably within a range of 5,000 to 10,000.

The weight average molecular weight and the number average molecular weight of the polymer compound can be measured by gel permeation chromatography (GPC) in terms of polystyrene.

To be specific, a GPC apparatus HLC-8120GPC (manufactured by Tosoh Corp.) and a column TSKguardcolumn+TSKgelSuperHZ-m3 series (manufactured by Tosoh Corp.) are used. While the column temperature is maintained at 40° C., tetrahydrofuran as a carrier solvent is allowed to flow at a flow rate of 0.2 mL/min. Thereafter, 10 μL of the prepared sample solution is injected into the GPC apparatus together with the carrier solvent. The sample is detected using a refractive index detector (RI detector), and the molecular weight distribution of the sample is calculated using a calibration curve measured using monodisperse polystyrene standard particles.

Preferred examples of the polymer compound according to the present invention include the following polymer compounds A to E. In the structures of the following polymer compounds A to E, n is preferably an integer of 10 to 50.

[Chem. 3]

POLYMER COMPOUND A

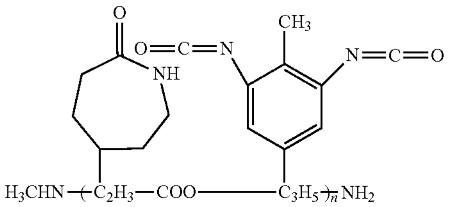

POLYMER COMPOUND B

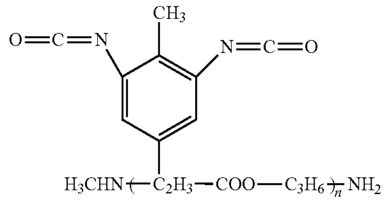

POLYMER COMPOUND C

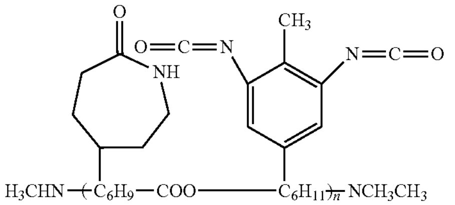

POLYMER COMPOUND D

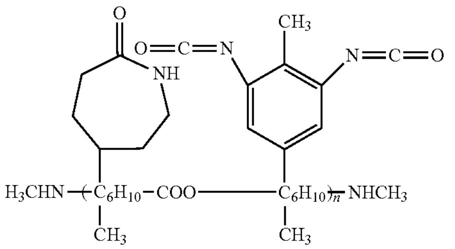

POLYMER COMPOUND E

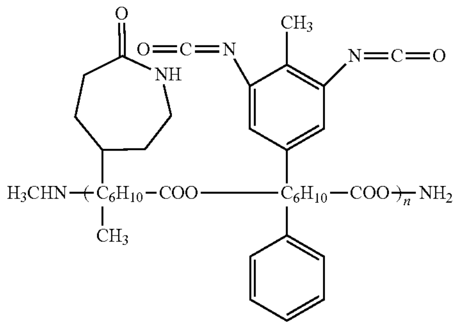

As a preferable commercially available product of the polymer compound, for example, DISPERBYK-168 (manufactured by BYK Japan KK) is preferable.

The content of the polymer compound in the ink is preferably more than 0% by mass and 5% by mass or less with respect to the total ink of the present invention.

The polymer compound is preferably used as a dispersant for increasing the dispersibility of a pigment described later in the preparation of a pigment dispersion liquid.

<Active Ray Polymerizable Compound>

The active ray polymerizable compound is a polymerizable compound which is crosslinked or polymerized by irradiation with active rays.

As described above, the active rays are preferably ultraviolet rays. The photopolymerizable compound is a radically polymerizable compound or a cationically polymerizable compound, and preferably a radically polymerizable compound.

The radically polymerizable compound is a compound (a monomer, an oligomer, a polymer, or a mixture thereof) having a radically polymerizable ethylenically unsaturated bond. The radically polymerizable compounds may be used alone or in combination of two or more kinds thereof.

Examples of the compound having a radically polymerizable ethylenically unsaturated bond include an unsaturated carboxylic acid and a salt thereof, an unsaturated carboxylic acid ester compound, an unsaturated carboxylic acid urethane compound, an unsaturated carboxylic acid amide compound and an anhydride thereof. Examples of the compound having an ethylenically unsaturated bond include acrylonitrile, styrene, unsaturated polyester, unsaturated polyether, unsaturated polyamide, and unsaturated urethane. Examples of the unsaturated carboxylic acid include (meth) acrylic acid, itaconic acid, crotonic acid, isocrotonic acid, and maleic acid.

In particular, the radically polymerizable compound is preferably an unsaturated carboxylic acid ester compound, and more preferably a (meth) acrylate compound. The (meth) acrylate compound may not be a monomer described later but an oligomer, a mixture of the monomer and the oligomer, a modified product, an oligomer having a polymerizable functional group, or the like.

Examples of the (meth) acrylate compound include:

monofunctional monomers such as isoamyl (meth) acrylate, stearyl (meth) acrylate, lauryl (meth) acrylate, octyl (meth) acrylate, decyl (meth) acrylate, isomyristyl (meth) acrylate, isostearyl (meth) acrylate, 2-ethylhexyl-diglycol (meth) acrylate, 2-hydroxybutyl (meth) acrylate, 2-(meth) acryloyloxyethylhexahydrophthalic acid, butoxyethyl (meth) acrylate, ethoxydiethylene glycol (meth) acrylate, methoxydiethylene glycol (meth) acrylate, methoxypolyethylene glycol (meth) acrylate, methoxypropylene glycol (meth) acrylate, phenoxyethyl (meth) acrylate, tetrahydrofurfuryl (meth) acrylate, isobornyl (meth) acrylate, 2-hydroxyethyl (meth) acrylate, 2-hydroxypropyl (meth) acrylate, 2-hydroxy-3-phenoxypropyl (meth) acrylate, 2-(meth) acryloyloxyethylsuccinic acid, 2-(meth) acryloyloxyethylphthalic acid, 2-(meth) acryloyloxyethyl-2-hydroxyethyl-phthalic acid and t-butylcyclohexyl (meth) acrylate;

bifunctional monomers such as triethylene glycol di (meth) acrylate, tetraethylene glycol di (meth) acrylate, polyethylene glycol di (meth) acrylate, tripropylene glycol di (meth) acrylate, polypropylene glycol di (meth) acrylate, 1,4-butanediol di (meth) acrylate, 1,6-hexanediol di (meth) acrylate, 1,9-nonanediol di (meth) acrylate, neopentyl glycol di (meth) acrylate, dimethylol-tricyclodecane di (meth) acrylate, PO adduct di (meth) acrylate of bisphenol A, hydroxypivalic acid neopentyl glycol di (meth) acrylate and polytetramethylene glycol di (meth) acrylate; and trifunctional or more polyfunctional monomers such as trimethylolpropane tri (meth) acrylate, pentaerythritol tri (meth) acrylate, pentaerythritol tetra (meth) acrylate, dipentaerythritol hexa (meth) acrylate, ditrimethylolpropane tetra (meth) acrylate, glycerolpropoxy tri (meth) acrylate, and pentaerythritol ethoxy tetra (meth) acrylate.

The (meth) acrylate compound may be a modified product, and examples thereof include ethylene oxide-modified (meth) acrylate compounds such as ethylene oxide-modified trimethylolpropane tri (meth) acrylate and ethylene oxide-modified pentaerythritol tetraacrylate; caprolactone-modified (meth) acrylate compounds such as caprolactone-modified trimethylolpropane tri (meth) acrylate; and caprolactam-modified (meth) acrylate compounds such as caprolactam-modified dipentaerythritol hexa (meth) acrylate.

Among these, an ethylene oxide-modified (meth) acrylate compound is preferable from the viewpoint of high photosensitivity and easy formation of a card house structure described below at the time of gelation at a low temperature. In addition, since the ethylene oxide-modified (meth) acrylate compound is easily dissolved in other ink components at a high temperature, and also curing shrinkage is small, curling of a print product hardly occurs.

Examples of the ethylene oxide-modified (meth) acrylate compound include: 4EO modified hexanediol diacrylate CD561 (molecular weight: 358), 3EO modified trimethylolpropane triacrylate SR454 (molecular weight: 429), 6EO modified trimethylolpropane triacrylate SR499 (molecular weight: 560) and 4EO modified pentaerythritol tetraacrylate SR494 (molecular weight: 528) manufactured by Sartomer; polyethylene glycol diacrylate NK Ester A-400 (molecular weight: 508), polyethylene glycol diacrylate NK Ester A-600 (molecular weight: 742), polyethylene glycol dimethacrylate NK Ester 9G (molecular weight: 536) and polyethylene glycol dimethacrylate NK Ester 14G (molecular weight: 770) manufactured by Shin-Nakamura Chemical Co., Ltd.; tetraethylene glycol diacrylate V #335HP (molecular weight: 302) manufactured by Osaka Organic Chemical Industry Ltd.; 3PO modified trimethylolpropane triacrylate Photomer 4072 (molecular weight: 471, C log P: 4.90) manufactured by Cognis; 1.10 decanediol dimethacrylate NK Ester DOD-N (molecular weight: 310, C log P: 5.75), tricyclodecanedimethanol diacrylate NK Ester A-DCP (molecular weight: 304, C log P: 4.69) and tricyclodecane dimethanol dimethacrylate NK Ester DCP (molecular weight: 332, C log P: 5.12) manufactured by Shin-Nakamura Chemical Co., Ltd.; and trimethylolpropane PO modified triacrylate Miramer M360 (molecular weight: 471, C log P: 4.90) manufactured by Miwon.

The (meth) acrylate compound may be a polymerizable oligomer. Examples of the polymerizable oligomer include an epoxy (meth) acrylate oligomer, an aliphatic urethane (meth) acrylate oligomer, and an aromatic urethane (meth) acrylate oligomer. Furthermore, examples of the polymerizable oligomer include a polyester (meth) acrylate oligomer and a linear (meth) acryl oligomer.

The cationically polymerizable compound may be an epoxy compound, a vinyl ether compound, an oxetane compound, or the like. The cationically polymerizable compound may be used alone or in combination of two or more kinds thereof.

The epoxy compound is an aromatic epoxide, an alicyclic epoxide, an aliphatic epoxide, or the like, and in order to increase curability, an aromatic epoxide or an alicyclic epoxide are preferable.

The aromatic epoxide may be di- or polyglycidyl ether obtained by reacting polyhydric phenol or an alkylene oxide adduct thereof with epichlorohydrin.

Examples of the polyhydric phenol or the alkylene oxide adduct thereof to be reacted include bisphenol A or an alkylene oxide adduct thereof. The alkylene oxide in the alkylene oxide adduct may be ethylene oxide, propylene oxide, or the like.

The alicyclic epoxide may be a cycloalkane oxide-containing compound obtained by epoxidizing a cycloalkane-containing compound with an oxidizing agent such as hydrogen peroxide or peracid. The cycloalkane in the cycloalkane oxide-containing compound may be cyclohexene or cyclopentene.

The aliphatic epoxide may be di- or polyglycidyl ether obtained by reacting aliphatic polyhydric alcohol or an alkylene oxide adduct thereof with epichlorohydrin.

Examples of the aliphatic polyhydric alcohol include alkylene glycols such as ethylene glycol, propylene glycol, and 1,6-hexanediol. The alkylene oxide in the alkylene oxide adduct may be ethylene oxide, propylene oxide, or the like.

Examples of the vinyl ether compound include:

monovinyl ether compounds such as ethyl vinyl ether, n-butyl vinyl ether, isobutyl vinyl ether, octadecyl vinyl ether, cyclohexyl vinyl ether, hydroxybutyl vinyl ether, 2-ethylhexyl vinyl ether, cyclohexanedimethanol monovinyl ether, n-propyl vinyl ether, isopropyl vinyl ether, isopropenyl ether-o-propylene carbonate, dodecyl vinyl ether, diethylene glycol monovinyl ether, and octadecyl vinyl ether; and di- or tri-vinyl ether compounds such as ethylene glycol divinyl ether, diethylene glycol divinyl ether, triethylene glycol divinyl ether, propylene glycol divinyl ether, dipropylene glycol divinyl ether, butanediol divinyl ether, hexanediol divinyl ether, cyclohexanedimethanol divinyl ether and trimethylolpropane trivinyl ether.

Of these vinyl ether compounds, di- or tri-vinyl ether compounds are preferred in view of curability, adhesion, and the like.

The oxetane compound is a compound having an oxetane ring. Examples of the oxetane compound include oxetane compounds described in Japanese Unexamined Patent Publication No. 2001-220526, Japanese Unexamined Patent Publication No. 2001-310937, and Japanese Unexamined Patent Publication No. 2005-255821.

Among these, a compound(s) represented by General Formula (1) described in Paragraph No. 0089 of Japanese Unexamined Patent Publication No. 2005-255821, and a compound(s) represented by General Formula (2) described in Paragraph No. 0092 of the same may be mentioned. In addition, a compound(s) represented by General Formula (7) in Paragraph No. 0107 of Japanese Unexamined Patent Publication No. 2005-255821, a compound(s) represented by General Formula (8) in Paragraph No. 0109, a compound(s) represented by General Formula (9) in Paragraph No. 0116 may be mentioned.

The General Formulae (1), (2) and (7) to (9) in Japanese Unexamined Patent Publication No. 2005-255821 are shown below.

[Chem. 4]

GENERAL FORMULA (1)

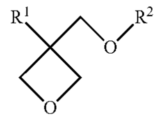

GENERAL FORMULA (2)

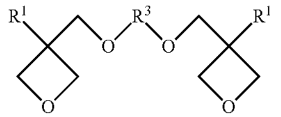

GENERAL FORMULA (7)

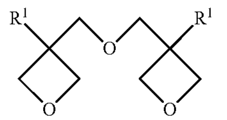

GENERAL FORMULA (8)

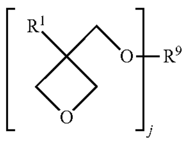

GENERAL FORMULA (9)

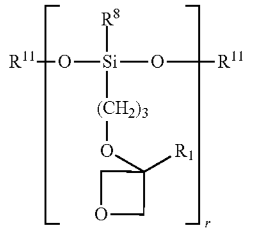

The content of the active ray polymerizable compound contained in the ink of the present invention is preferably in the range of 1 to 97 mass % and more preferably in the range of 30 to 95 mass % with respect to the total mass of the ink.

<Photopolymerization Initiator>

The ink of the present invention contains a photopolymerization initiator.

As the photopolymerization initiator, there are an intramolecular bond cleavage type initiator and an intramolecular hydrogen abstraction type initiator.

Examples of the intramolecular bond cleavage type photopolymerization initiator include: acetophenones such as diethoxyacetophenone, 2-hydroxy-2-methyl-1-phenylpropan-1-one, benzyldimethylketal, 1-(4-isopropylphenyl)-2-hydroxy-2-methylpropan-1-one, 4-(2-hydroxyethoxy) phenyl-(2-hydroxy-2-propyl) ketone, 1-hydroxycyclohexyl-phenylketone, 2-methyl-2-morpholino (4-thiomethylphenyl) propan-1-one and 2-benzyl-2-dimethylamino-1-(4-morpholinophenyl)-butanone; benzoins such as benzoin, benzoin methyl ether and benzoin isopropyl ether; acylphosphine oxides such as 2,4,6-trimethylbenzoin diphenylphosphine oxide; and benzyl and methylphenyl glyoxy esters.

Examples of the intramolecular hydrogen abstraction type photopolymerization initiator include: benzophenones such as benzophenone, methyl-4-phenylbenzophenone o-benzoylbenzoate, 4,4'-dichlorobenzophenone, hydroxybenzophenone, 4-benzoyl-4'-methyl-diphenyl sulfide, acrylated benzophenone, 3,3',4,4'-tetra (t-butylperoxycarbonyl) benzophenone, and 3,3'-dimethyl-4-methoxybenzophenone; thioxanthones such as 2-isopropylthioxanthone, 2,4-dimethylthioxanthone, 2,4-diethylthioxanthone, and 2,4-dichlorothioxanthone; aminobenzophenones such as Michler's ketone and 4,4'-diethylaminobenzophenone; and 10-butyl-2-chloroacridone, 2-ethylanthraquinone, 9,10-phenanthrenequinone, and camphorquinone.

When the photopolymerization initiator is acylphosphine oxide or acyl phosphonate, the sensitivity is excellent. Specifically, as the photopolymerization initiator, bis (2,4,6-trimethylbenzoyl)-phenylphosphine oxide, bis (2,6-dimethoxybenzoyl)-2,4,4-trimethyl-pentylphosphine oxide, or the like is preferable.

The content of the photopolymerization initiator in the ink of the present invention is preferably in the range of 0.1 to 10% by mass, although it depends on the light to be applied at the time of ink curing, the type of the photopolymerizable compound and so forth.

The photopolymerization initiator in the ink of the present invention may contain a photoacid generator. Examples of the photoacid generator include compounds used in chemically amplified photoresist and photocationic polymerization.

For such compounds, it is preferable to refer to, for example, "Organic Materials for Imaging" edited by The Japanese Research Association for Organic Electronics Materials, published by Bun-Shin Co., Ltd. (1993), pages 187 to 192.

The ink of the present invention may further contain a photopolymerization initiator auxiliary agent, a polymerization inhibitor, and the like, if necessary.

The photopolymerization initiator auxiliary agent may be a tertiary amine compound, and is preferably an aromatic tertiary amine compound.

Examples of the aromatic tertiary amine compound include N,N-dimethylaniline, N,N-diethylaniline, N,N-dimethyl-p-toluidine, N,N-dimethylamino-p-benzoic acid ethyl ester, N,N-dimethylamino-p-benzoic acid isoamylethyl ester, N,N-dihydroxyethylaniline, triethylamine, and N,N-dimethylhexylamine. Among these, N,N-dimethylamino-p-benzoic acid ethyl ester and N,N-dimethylamino-p-benzoic acid isoamylethyl ester are preferable examples of the aromatic tertiary amine compound. The ink of the present invention may contain only one of these compounds, or may contain two or more of these compounds.

Examples of the polymerization inhibitor include (alkyl) phenol, hydroquinone, catechol, resorcin, p-methoxyphenol, t-butylcatechol, t-butylhydroquinone, pyrogallol, 1,1-picrylhydrazyl, phenothiazine, p-benzoquinone, nitrosobenzene, 2,5-di-t-butyl-p-benzoquinone, dithiobenzoyl disulfide, picric acid, cupferron, aluminum N-nitrosophenylhydroxylamine, tri-p-nitrophenylmethyl, N-(3-oxyanilino-1,3-dimethylbutylidene) aniline oxide, dibutylcresol, cyclohexanone oxime cresol, guaiacol, o-isopropylphenol, butyraldoxime, methyl ethyl ketoxime and cyclohexanone oxime.

<Coloring Material>

The ink of the present invention may further contain a coloring material.

The coloring material may be a dye or a pigment. The pigment is more preferable because it has good dispersibility in the constituent components of the ink and is excellent in weather resistance.

The dye may be an oil-soluble dye or the like. Examples of the oil-soluble dye include the following various dyes. Examples of magenta dyes include: MS Magenta VP, MS Magenta HM-1450 and MS Magenta HSo-147 (manufactured by Mitsui Toatsu Chemicals, Inc.); AIZEN SOT Red-1, AIZEN SOT Red-2, AIZEN SOT Red-3, AIZEN SOT Pink-1 and SPIRON Red GEH SPECIAL (all manufactured by Hodogaya Chemical Co., Ltd.); RESOLIN Red FB 200%, MACROLEX Red Violet R, MACROLEX ROT5B (all manufactured by Bayer Japan Ltd.); KAYASET Red B, KAYASET Red 130 and KAYASET Red 802 (all manufactured by Nippon Kayaku Co., Ltd.); PHLOXIN, ROSE BENGAL and ACID Red (all manufactured by Daiwa Kasei Co., Ltd.); HSR-31 and DIARESIN Red K (all manufactured by Mitsubishi Kasei Corporation); and Oil Red (manufactured by BASF Japan Ltd.).

Examples of cyan dyes include: MS Cyan HM-1238, MS Cyan HSo-16, Cyan HSo 144 and MS Cyan VPG (all manufactured by Mitsui Toatsu Chemicals, Inc.); AIZEN SOT Blue-4 (manufactured by Hodogaya Chemical Co., Ltd); RESOLIN BR. Blue BGLN 200%, MACROLEX Blue RR, CERES Blue GN, SIRIUS SUPRATURQ. Blue Z-BGL and SIRIUS SUPRA TURQ. Blue FB-LL 330% (all manufactured by Bayer Japan Ltd.); KAYASET Blue FR, KAYASET Blue N, KAYASET Blue 814, Turq. Blue GL-5 200 and Light Blue BGL-5 200 (all manufactured by Nippon Kayaku Co., Ltd.); DAIWA Blue 7000, Oleosol Fast Blue GL (all manufactured by Daiwa Kasei Co., Ltd.); DIARESIN Blue P (manufactured by Mitsubishi Kasei Corporation); SUDAN Blue 670, NEOPEN Blue 808 and ZAPON Blue 806 (all manufactured by BASF Japan Ltd.).

Examples of yellow dyes include: MS Yellow HSm-41, Yellow KX-7 and Yellow EX-27 (Mitsui Toatsu Chemicals, Inc.); AIZEN SOT Yellow-1, AIZEN SOT Yellow-3 and AIZEN SOT Yellow-6 (Hodogaya Chemical Co., Ltd.); MACROLEX Yellow 6G and MACROLEX FLUOR. Yellow 10GN (Bayer Japan Ltd.); KAYASET Yellow SF-G, KAYASET Yellow 2G, KAYASET Yellow A-G and KAYASET Yellow E-G (Nippon Kayaku Co., Ltd.); DAIWA Yellow 330HB (Daiwa Kasei Co., Ltd.); HSY-68 (Mitsubishi Kasei Corporation); and SUDAN Yellow 146 and NEOPEN Yellow 075 (BASF Japan Ltd.).

Examples of black dyes include: MS Black VPC (manufactured by Mitsui Toatsu Chemicals, Inc.); AIZEN SOT Black-1 and AIZEN SOT Black-5 (all manufactured by Hodogaya Chemical Co., Ltd.); RESORIN Black GSN 200% and RESOLIN Black BS (all manufactured by Bayer Japan Ltd.); KAYASET Black A-N (manufactured by Nippon Kayaku Co., Ltd.); DAIWA Black MSC (manufactured by Daiwa Kasei Co., Ltd.); HSB-202 (manufactured by Mitsubishi Kasei Corporation); and NEPTUNE Black X60 and NEOPEN Black X58 (all manufactured by BASF Japan Ltd.).

The pigment is not particularly limited, but, for example, may be an organic pigment or an inorganic pigment having a number below that is described in the color Index.

Examples of red or magenta pigments include Pigment Red 3, 5, 19, 22, 31, 38, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226, and 257, Pigment Violet 3, 19, 23, 29, 30, 37, 50, and 88, and Pigment Orange 13, 16, 20, and 36.

Examples of blue or cyan pigments include Pigment Blue 1, 15, 15:1, 15:2, 15:3, 15:4, 15:6, 16, 17-1, 22, 27, 28, 29, 36, and 60.

Examples of green pigments include Pigment Green 7, 26, 36, and 50.

Examples of yellow pigments include Pigment Yellow 1, 3, 12, 13, 14, 17, 34, 35, 37, 55, 74, 81, 83, 93, 94, 95, 97, 108, 109, 110, 137, 138, 139, 153, 154, 155, 157, 166, 167, 168, 180, 185, and 193.

Examples of black pigments include Pigment Black 7, 28, and 26.

Examples of commercially available products of pigments include:

Chromofine Yellow 2080, 5900, 5930, AF-1300, 2700 L, Chromofine Orange 3700 L, 6730, Chromofine Scarlet 6750, Chromofine Magenta 6880, 6886, 6891N, 6790, 6887, Chromofine Violet RE, Chromofine Red 6820, 6830, Chromofine Blue HS-3, 5187, 5108, 5197, 5085N, SR-5020, 5026, 5050, 4920, 4927, 4937, 4824, 4933GN-EP, 4940, 4973, 5205, 5208, 5214, 5221, 5000P, Chromofine Green 2GN, 2GO, 2G-550D, 5310, 5370, 6830, Chromofine BlackA-1103, Seika Fast Yellow 10GH, A-3, 2035, 2054, 2200, 2270, 2300, 2400(B), 2500, 2600, ZAY-260, 2700(B), 2770, Seika Fast Red 8040, C405(F), CA120, LR-116, 1531B, 8060R, 1547, ZAW-262, 1537B, GY, 4R-4016, 3820, 3891, ZA-215, Seika Fast Carmine 6B1476T-7, 1483LT, 3840, 3870, Seika Fast Bordeaux 10B-430, Seika Light Rose R40, Seika Light Violet B800, 7805, Seika Fast Maroon 460N, Seika Fast Orange 900, 2900, Seika Light Blue C718, A612, and Cyanine Blue 4933M, 4933GN-EP, 4940, 4973 (manufactured by Dainichiseika Color & Chemicals Mfg. Co., Ltd.);

KET Yellow 401, 402, 403, 404, 405, 406, 416, 424, KET Orange 501, KET Red 301, 302, 303, 304, 305, 306, 307, 308, 309, 310, 336, 337, 338, 346, KET Blue 101, 102, 103, 104, 105, 106, 111, 118, 124, and KET Green 201 (manufactured by Dainippon Ink and Chemicals);

Colortex Yellow 301, 314, 315, 316, P-624, 314, U10GN, U3GN, UNN, U A-414, U263, Finecol Yellow T-13, T-05, Pigment Yellow 1705, Colortex Orange 202, Colortex Red 101, 103, 115, 116, D3B, P-625, 102, H-1024, 105C, UFN, UCN, UBN, U3BN, URN, UGN, UG276, U456, U457, 105C, USN, Colortex Maroon 601, Colortex Brown B610N, Colortex Violet 600, Pigment Red 122, Colortex Blue 516, 517, 518, 519, A818, P-908, 510, Colortex Green 402, 403, and Colortex Black 702, U905 (manufactured by Sanyo Color Works, LTD.);

Lionol Yellow 1405G, Lionol Blue FG7330, FG7350, FG7400G, FG7405G, ES, ESP-S (manufactured by artience Co., Ltd.); Toner Magenta E02, Permanent Rubin F6B, Toner Yellow HG, Permanent Yellow GG-02, Hostapeam Blue B2G (manufactured by Hoechst AG);

Novoperm P-HG, Hostaperm Pink E, Hostaperm Blue B2G (manufactured by Clariant); and Carbon Black #2600, #2400, #2350, #2200, #1000, #990, #980, #970, #960, #950, #850, MCF88, #750, #650, MA600, MA7, MA8, MA11, MA100, MA100R, MA77, #52, #50, #47, #45, #45L, #40, #33, #32, #30, #25, #20, #10, #5, #44, CF9 (manufactured by Mitsubishi Chemical Corporation).

The average particle diameter of the pigment is preferably 0.08 to 0.5 μm.

The maximum particle diameter of the pigment is preferably 0.3 to 10 μm, and more preferably 0.3 to 3 μm. Adjustment of the particle diameter of the pigment is preferable in that clogging of nozzles of an inkjet recording head can be suppressed and that the storage stability of the ink, the transparency of the ink, and the curing sensitivity of the ink can be maintained.

The content of the pigment or dye is preferably 0.1 to 20 mass % and more preferably 0.4 to 10 mass % with respect to the active ray curable inkjet ink. This is because if the content of the pigment or dye is too small, the color development of the obtained image is not sufficient, and if it is too large, the viscosity of the ink becomes high and the ejection property lowers.

The pigment can be dispersed using, for example, a ball mill, a sand mill, an attritor, a roll mill, an agitator, a Henschel mixer, a colloid mill, an ultrasonic homogenizer, a pearl mill, a wet-type jet mill, or a paint shaker.

The dispersion of the pigment is preferably performed such that the average particle diameter of the pigment particles is 0.08 to 0.5 μm, and the maximum particle diameter is 0.3 to 10 μm, more preferably 0.3 to 3 μm. The dispersion of the pigment is adjusted by selection of the pigment, the dispersant and the dispersion medium, dispersion conditions, filtration conditions, and the like.

Since the ink of the present invention contains the above-described polymer compound, the dispersibility of the pigment can be enhanced, but the ink may further contain another dispersant.

Examples of the dispersant include hydroxyl group-containing carboxylic acid ester, salt of long-chain polyaminoamide and high-molecular-weight acid ester, salt of high-molecular-weight polycarboxylic acid, salt of long-chain polyaminoamide and polar acid ester, high-molecular-weight unsaturated acid ester, high-molecular-weight copolymer, modified polyurethane, modified polyacrylate, polyether ester-type anionic surfactant, naphthalenesulfonic acid-formalin condensate salt, aromatic sulfonic acid-formalin condensate salt, polyoxyethylene alkyl phosphate ester, polyoxyethylene nonylphenyl ether, and stearylamine acetate. Examples of commercially available products of the dispersant include Solsperse series manufactured by Avecia Inc. and PB series manufactured by Ajinomoto Fine-Techno Co., Inc.

The active ray curable inkjet ink may further contain a dispersion auxiliary agent, if necessary. The dispersion auxiliary agent may be selected according to the pigment.

The total amount of the dispersant and the dispersion auxiliary agent is preferably in the range of 1 to 50% by mass with respect to the pigment.

The ink of the present invention may further contain a dispersion medium for dispersing the pigment, if necessary.

Although a solvent may be contained in the ink as the dispersion medium, the photopolymerizable compound as described above is preferably the dispersion medium in order to prevent the solvent from remaining in the formed image. As the dispersion medium, a monomer having low viscosity is preferable in particular.

<Other Components>

The ink of the present invention may further contain other components, if necessary.

The other components may be various additives, other resins, and the like.

Examples of the additive include a surfactant, a leveling additive, a matting agent, a UV absorber, an infrared absorber, an antibacterial agent, and a basic compound for enhancing the storage stability of the ink.

Examples of the basic compound include basic alkali metal compounds, basic alkaline earth metal compounds, and basic organic compounds such as amine. Examples of the other resins include a resin for adjusting physical properties of a cured film. Examples of such resin include polyester-based resins, polyurethane-based resins, vinyl-based resins, acrylic-based resins, rubber-based resins, and waxes.

<Inkjet Ink of Sol-Gel Phase Transition Type>

Since the active ray curable inkjet ink of the present invention contains the gelling agent as described above, it undergoes a sol-gel phase transition reversibly depending on the temperature. The active ray curable ink that undergoes sol-gel phase transition is liquid (sol) at high temperature (e.g., about 80° C.), and therefore can be ejected in the sol state from an inkjet recording head. When the ink is ejected at high temperature, ink droplets (dots) land on a recording medium and then naturally cooled to gel. Thus, coalescence of adjacent dots can be suppressed and image quality can be enhanced.

In order to enhance the ejectability of ink droplets, the viscosity of the ink under high temperature is preferably equal to or lower than a certain level. To be specific, the viscosity of the ink at 80° C. is preferably within a range of 3 to 20 mPa-s. Meanwhile, in order to suppress coalescence of adjacent dots, it is preferable that the ink viscosity at normal temperature after their landing is a certain level or higher. To be specific, the viscosity of the ink at 25° C. is preferably 1,000 mPa-s or more.

The gelation temperature of the ink is preferably within a range of 40 to 70° C. from the viewpoint of satisfactory ejection property, and more preferably within a range of 50 to 65° C. The gelation temperature is a temperature at which the ink in the sol state is gelled and the fluidity is reduced in the process of cooling the ink in the sol state.

The viscosity at 80° C., the viscosity at 25° C. and the gelation temperature of the ink can be obtained by measuring the temperature change of the dynamic viscoelasticity of the ink using a rheometer. Specifically, a temperature change curve of viscosity is obtained when the ink is heated to 100° C. and cooled to 20° C. under the conditions of a shear rate of 11.7 (/s) and a temperature decrease rate of 0.1° C./s. The viscosity at 80° C. and the viscosity at 25° C. can be obtained by reading the viscosities at 80° C. and 25° C., respectively, at the temperature change curve of viscosity. The gelation temperature can be obtained as a temperature at which the viscosity becomes 200 mPa·s at the temperature change curve of viscosity.

As the rheometer, a stress-controlled rheometer PhysicaMCR series manufactured by Anton Paar GmbH can be used. The cone plate may have a diameter of 75 mm and a cone angle of 1.0 degree.

[Method for Producing Ink]

The ink of the present invention is obtained by mixing the above-described active ray polymerizable compound, photopolymerization initiator, polymer compound and gelling agent, and if necessary, other components under heating. Preferably, a pigment dispersant in which a color material (particularly, a pigment) is dispersed in part of the active ray polymerizable compound is prepared, and the pigment dispersant is mixed with the other ink components. The obtained ink is preferably filtered with a predetermined filter.

[Inkjet Recording Apparatus and Image Recording Method Using Same]

The inkjet recording apparatus of the active ray curable inkjet method used in the present invention will be described.

As the inkjet recording apparatus of the active ray curable inkjet method, there are an apparatus of the line recording method (single-pass recording method) and an apparatus of the serial recording method. Although it can be selected according to the required resolution of an image or recording speed, the inkjet recording apparatus of the line recording method (single-pass recording method) is preferable from the viewpoint of high-speed recording.

Figure 1B:
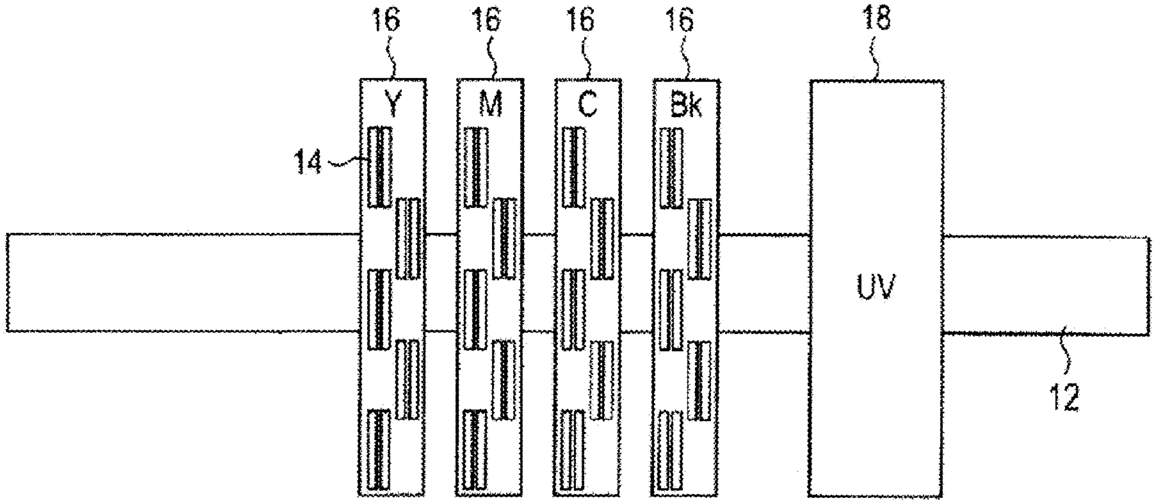
FIG. 1B is a diagram illustrating the example of the configuration of the main portion of the inkjet recording apparatus of the line recording method.

FIG. 1A and FIG. 1B are each a diagram illustrating an example of a configuration of a main portion of an inkjet recording apparatus of a line recording method. Of these, FIG. 1A is a side view, and FIG. 1B is a top view.

As illustrated in FIG. 1A and FIG. 1B, an inkjet recording apparatus 10 includes a head carriage 16, an ink channel 30, an ink tank 31, an active ray emitter 18, and a temperature controller 19.

The head carriage 16 houses a plurality of inkjet recording heads 14.

The ink tank 31 stores ink to be supplied through the ink channel 30 connected to the head carriage 16.

The active ray emitter 18 covers the entire width of a recording medium 12 and is disposed on the downstream side (in a recording medium conveyance direction) of the head carriage 16.

The temperature controller 19 is disposed on the lower surface of the recording medium 12. Hereinafter details will be described.

The head carriage 16 is fixedly disposed so as to cover the entire width of the recording medium 12, and houses the plurality of inkjet recording heads 14 provided for the respective colors. Ink is supplied to the inkjet recording head 14. For example, ink may be supplied directly or by an ink supplying means (not illustrated) from an ink cartridge (not illustrated) detachably attached to the inkjet recording apparatus 10.

The inkjet recording heads 14 are arranged in the conveyance direction of the recording medium 12 for the respective colors.

The number of inkjet recording heads 14 disposed in the conveyance direction of the recording medium 12 is set by the nozzle density of the inkjet recording heads 14 and the resolution of an image to be printed.

For example, if an image having a resolution of 1,400 dpi is formed by using the inkjet recording heads 14 having a droplet amount of 2 pl and a nozzle density of 360 dpi, it is preferable that four inkjet recording heads 14 are disposed to be shifted, with respect to the conveyance direction of the recording medium 12.

If an image having a resolution of 720×720 dpi is formed by using the inkjet recording heads 14 having a droplet amount of 6 pl and a nozzle density of 360 dpi, it is preferable that two inkjet recording heads 14 are disposed to be shifted. The "dpi" represents the number of ink droplets (dots) per 2.54 cm.

The ink tank 31 is connected to the head carriage 16 via the ink channel 30. The ink channel 30 is a path for supplying ink in the ink tank 31 to the head carriage 16. In order to stably eject ink droplets, the ink in the ink tank 31, the ink channel 30, the head carriage 16 and the inkjet recording heads 14 is heated to a predetermined temperature and maintains its gel state.

The active ray emitter 18 covers the entire width of the recording medium 12, and is arranged on the downstream side of the head carriage 16 in the recording medium conveyance direction. The active ray emitter 18 irradiates liquid droplets ejected by the inkjet recording heads 14 and landing on the recording medium with active rays to cure the liquid droplets.

In the case where the active rays are ultraviolet rays, examples of the active ray emitter 18 (ultraviolet ray emission means) include a fluorescent tube, a cold-cathode tube, an ultraviolet laser, low-pressure, medium-pressure and high-pressure mercury lamps having an operating pressure of several 100 Pa to 1 MPa, a metal halide lamp, and an LED. Examples of the fluorescent tube include a low-pressure mercury lamp and a germicidal lamp. In light of curability, UV emission means for emitting ultraviolet rays having an illumination of 100 $mW/cm^2$ or higher, to be specific, a high-pressure mercury lamp, a metal halide lamp, an LED or the like, is preferable. From the viewpoint of low power consumption, an LED is more preferable. To be specific, a 395 nm water-cooled LED manufactured by Phoseon Technology can be used.

In the case where the active rays are electron beams, examples of the active ray emitter 18 (electron beam emission means) include electron beam emission means of a scanning system, a curtain beam system, and a broad beam system. In light of processing capability, an electron beam emission means of a curtain beam system is preferable. Examples of the electron beam emission means include "Curetron EBC-200-20-30" manufactured by NHV Corporation and "Min-EB" manufactured by AIT Corporation.

The temperature controller 19 is disposed on the lower surface of the recording medium 12 and maintains the recording medium 12 at a predetermined temperature. The temperature controller 19 may be a heater of various types.

Hereinafter, an image recording method using the inkjet recording apparatus 10 of the line recording method will be described.

The recording medium 12 is conveyed to between the head carriage 16 and the temperature controller 19 of the inkjet recording apparatus 10. The recording medium 12 is adjusted to a predetermined temperature by the temperature controller 19.

High-temperature ink is ejected from the inkjet recording heads 14 of the head carriage 16 and adheres to (lands on) the recording medium 12. The active ray emitter 18 irradiates the ink droplets adhering to the recording medium 12 with active rays to cure the ink droplets.

The temperature of the ink in the inkjet recording heads 14 when the ink is ejected from the inkjet recording heads is preferably set to a temperature higher than the gelation temperature of the ink by 10 to 30° C. By setting the temperature in this range, the ejection property of the ink can be enhanced, and the ink components do not deteriorate.

The droplet amount of one droplet ejected from each nozzle of the inkjet recording heads 14 depends on the resolution of an image, but is preferably 1 to 10 pl, and more preferably 0.5 to 4.0 pl. A high-resolution image is formed by setting the droplet amount of liquid droplets to be in the range described above.

The irradiation with active rays is preferably performed within 10 seconds after the ink droplets adhere to the recording medium in order to suppress coalescence of adjacent ink droplets. The irradiation is performed preferably within 0.001 seconds to 5 seconds, and more preferably within 0.01 seconds to 2 seconds.

The irradiation with the active rays is preferably performed after the ink is ejected from all of the inkjet recording heads 14 accommodated in the head carriage 16.

The conveyance speed of the recording medium is preferably 500 to 2,000 mm/s. A higher conveyance speed is preferable because the image forming speed increases, but if the conveyance speed is too high, the image quality may deteriorate or the ink droplets may be insufficiently cured.

In the case where the active rays are electronic beams, the acceleration voltage of the irradiation with electronic beams is preferably 30 to 250 kV, and more preferably 30 to 100 kV, in order to perform sufficient curing. If the acceleration voltage is 100 to 250 kV, the amount of the electron-beam irradiation is preferably 30 to 100 kGy and more preferably 30 to 60 kGy.

The total ink film thickness after curing is preferably 2 to 25 μm. The "total ink film thickness" is the maximum value of the ink film thickness drawn on the recording medium.

Figure 2:
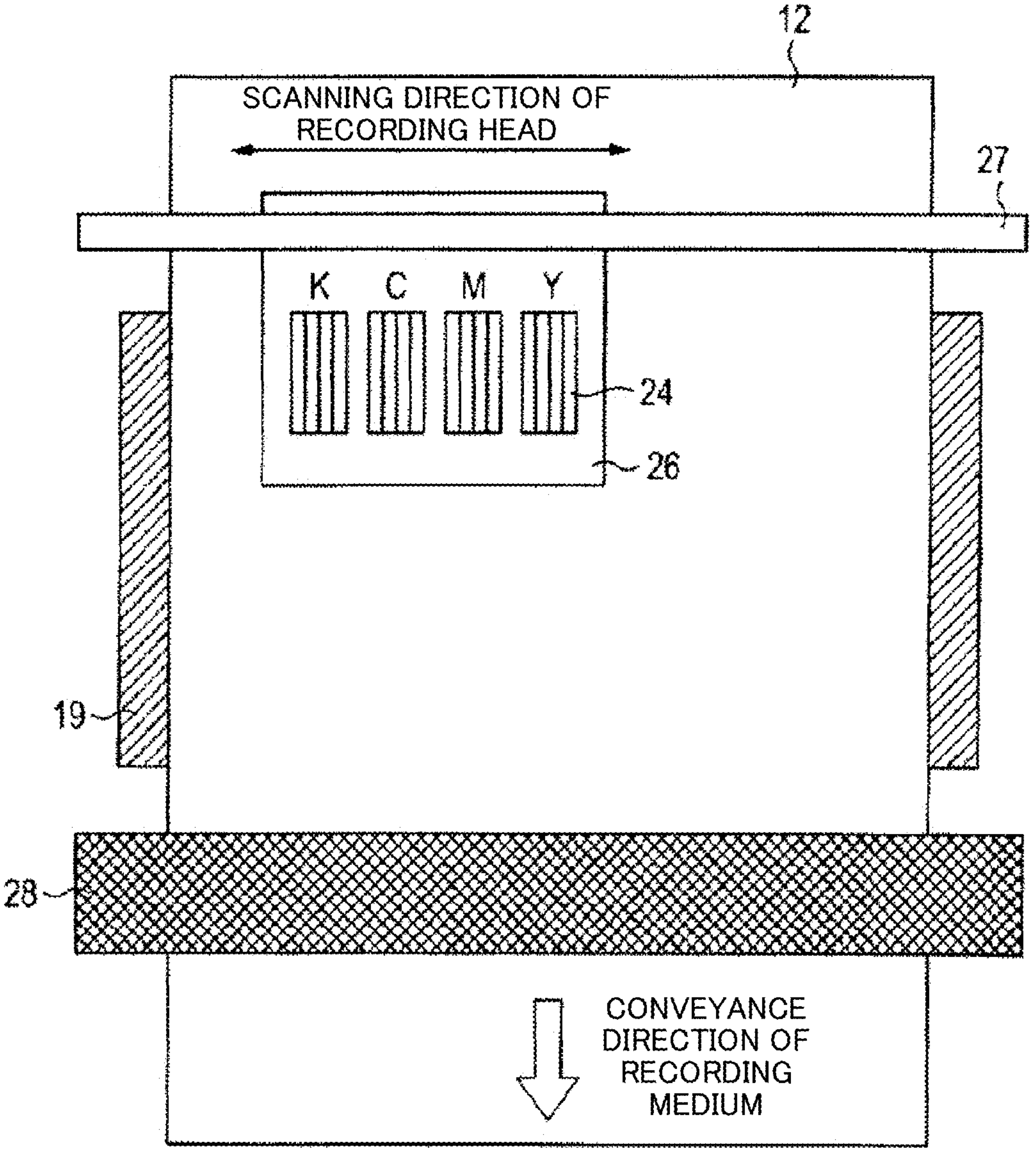
FIG. 2 is a diagram illustrating an example of a configuration of a main portion of an inkjet recording apparatus of a serial recording method.

FIG. 2 is a diagram illustrating an example of a configuration of a main portion of an inkjet recording apparatus 20 of a serial recording method.

As illustrated in FIG. 2, the inkjet recording apparatus 20 is the same as that shown in FIG. 1 except that the head carriage 16 fixedly disposed so as to cover the entire width of the recording medium has been replaced by a head carriage 26 and a guide section 27 described below.

The head carriage 26 has a width narrower than the entire width of the recording medium and houses a plurality of inkjet recording heads 24.

The guide section 27 moves the head carriage 26 in the width direction of the recording medium 12.

In the recording apparatus 20 of the serial recording method, while the head carriage 26 moves in the width direction of the recording medium 12 along the guide section 27, ink droplets are discharged from the inkjet recording heads 24 housed in the head carriage 26.

After the head carriage 26 completely moves in the width direction of the recording medium 12 (for each pass), the recording medium 12 is transported in the conveyance direction. Then, the active ray emitter 28 irradiates the ink droplets adhering to the recording medium 12 with light. Except for these operations, an image is recorded in substantially the same manner as in the inkjet recording apparatus 10 of the line recording method described above.

Examples

Hereinafter, the present invention will be specifically described by way of Examples, but the present invention is not limited thereto. Note that in the following Examples, operations were performed at room temperature (25° C.) unless otherwise specified. Further, unless otherwise specified, "%" and "part(s)" mean "% by mass" and "part(s) by mass", respectively.

[Preparation of Ink]

Each active ray curable inkjet ink was prepared from the following components.

<Preparation of Pigment Dispersion A>

The following polymer compound A and polymerizable compound were placed in a stainless steel beaker and dissolved and stirred for 1 hour while being heated on a hot plate at 65° C.

Pigment dispersant: polymeric compound A 9 parts by mass

Polymerizable compound: tricyclodecane dimethacrylate 70 parts by mass

After cooling it to room temperature, 20 parts by mass of the following pigment was added thereto, and the mixture was put in a glass bottle together with 200 g of zirconia beads having a diameter of 0.5 mm, and the glass bottle was hermetically sealed. This was subjected to dispersion treatment with a paint shaker for 8 hours, and then the zirconia beads were removed.

Pigment: Pigment Red 122 (manufactured by Dainichiseika Color & Chemicals Mfg. Co., Ltd., Chromofine Red 6112JC)

<Preparation of Pigment Dispersions B to I>

Each pigment dispersion was prepared in the same manner as in the preparation of the pigment dispersion A except that the polymer compound A was changed to the type and the content of polymer compound described in the following Table I.

The polymer compounds used are as follows. The weight average molecular weight and the number average molecular weight of each polymer compound were as shown in the following table. The weight average molecular weight and the number average molecular weight were calculated as described above.

[Chem. 5]

POLYMER COMPOUND A

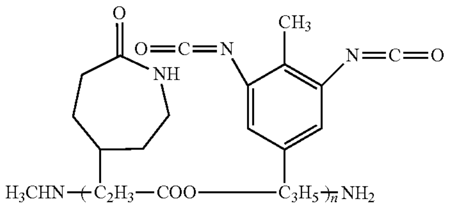

POLYMER COMPOUND B

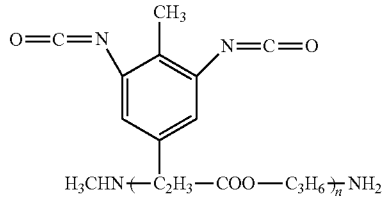

POLYMER COMPOUND C

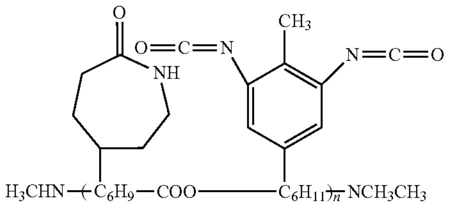

POLYMER COMPOUND D

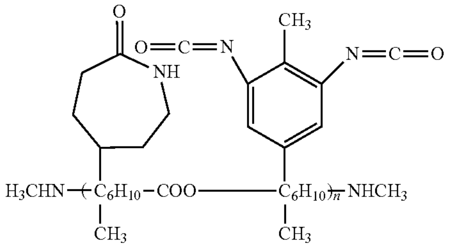

POLYMER COMPOUND E

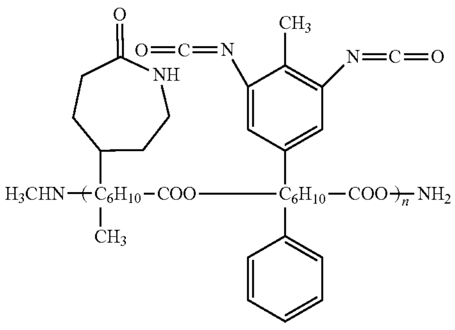

POLYMER COMPOUND F $H_3CHN—C_2H_4—COO—C_3H_6—NH_2$

<Active Ray Polymerizable Compound>

Tricyclodecane dimethanol diacrylate

6EO modified trimethylolpropane triacrylate

4EO modified pentaerythritol tetraacrylate

PO modified neopentyl glycol diacrylate

3PO modified trimethylolpropane triacrylate 3-methylpentanediol diacrylate 2-(2-vinyloxyethoxy) ethyl acrylate <Photopolymerization Initiator>

DAROCURE TPO (acylphosphine-based compound, manufactured by Basf SE)

<Gelling Agent>

Stearyl stearate (aliphatic ester compound, carbon number of alkyl group: C17-C18)

Distearyl ketone (aliphatic ketone compound, carbon number of alkyl group: C18-C18)

Icosyl icosanoate (aliphatic ester compound, carbon number of alkyl group: C19-C20)

Dilauryl ketone (aliphatic ketone compound, carbon number of alkyl group: C12-C12)

<Polymerization Inhibitor>

Irgastab UV10 (manufactured by Basf SE)

<Surfactant>

KF-352 (manufactured by Shin-Etsu Chemical Co., Ltd.)

<Preparation of Inks 1 to 10>

Components were mixed according to the ink compositions listed in the following Tables II to IV, and the mixtures were heated to 80° C. and stirred. While the temperature of each obtained solution was maintained, it was filtered through a Teflon® 3 μm membrane filter manufactured by ADVANTEC to prepare each ink.

Each ink was evaluated as follows.

<Inkjet Recording Method>

Four inkjet recording heads filled with Y, M, C and K inks were prepared. As each of the inkjet recording heads, a piezo head having a nozzle diameter of 20 μm and 512 nozzles (256 nozzle×2 rows, staggered arrangement, nozzle pitch per row of 360 dpi) was used. Recording was performed with a resolution of 1,440 dpi×1,440 dpi by ejecting the ink droplets at a droplet speed of about 6 m/s under the ejection condition(s) such that the droplet amount of one droplet was 2.5 pl. The image formation was performed under the environment of 23° C. and 55% RH. The "dpi" represents the number of dots per 2.54 cm.

Y, M, C and K images were formed using an inkjet recording apparatus of the line recording method. To be specific, printing coated paper A (OK Top Coat, basis weight of 128 g/m$^2$, manufactured by Oji Paper Co., Ltd.) was prepared. The temperature of the recording medium was adjusted to 25° C. by a temperature controller, and the conveyance speed was set to 500 mm/s.

Each obtained ink was filled in the inkjet recording heads of the inkjet recording apparatus, and heated such that the ink temperature became 80° C. Then, ink droplets thereof were ejected onto the printing coated paper A to form a 5 cm×5 cm solid image.

After printing, the ink was cured by irradiation with light (395 nm, 8 W/cm$^2$, water cooled unit) from an LED lamp manufactured by Phoseon Technology. The amount of light was measured by UV power meters C9536, H9958 manufactured by Hamamatsu Photonics K.K. The distance from the LED lamp to the surface of the recording medium was set to 20 mm.

<Blooming Evaluation>

The formed solid images were stored at 40° C. for 2 weeks, and blooming was evaluated by visual inspection according to the following evaluation criteria. The "AA" and "A" of the following criteria were regarded as having no practical problem.

(Criteria)

AA: In all the Y, M, C and K images, the number of precipitates or gloss unevenness (gloss uneven points) on the image surface is 0 even when they were observed 15 cm away.

A: In all the Y, M, C and K images, the number of precipitates or gloss unevenness is 1 to less than 10 on the image surface in part when they were observed 15 cm away, but the number of precipitates or gloss unevenness is 0 on the image surface when they were observed 30 cm away.

B: In all the Y, M, C and K images, the number of precipitates or gloss unevenness on the image surface is 10 or more even when they were observed 30 cm away.

[Preparation of Print Samples]

Using a piezo-type head that ejects droplets having a droplet amount of 14 pl, printing was performed with a resolution of 720 dpi on the following three kinds of paper with colored ink to prepare print samples. The "dpi" represents the number of dots per 2.54 cm. When recording was performed with an ink set of a colored ink and a colorless ink, prior to the printing with the colored ink, printing was performed on the entire recording region with the colorless ink such that the application amount became 6 g/m$^2$. Details of printing in each evaluation are described in the section of the description of each evaluation method.

Paper A: Shiraoi [64 g/m$^2$] (manufactured by Nippon Paper Industries Co., Ltd.)

Paper B: OK Prince High-quality Eco G100 [64 g/m$^2$] (manufactured by Oji Paper Co., Ltd.)

Paper C: Recycled High-quality [52 g/m$^2$] (manufactured by Nippon Paper Industries Co., Ltd.)

<Character Quality Evaluation>

A kanji meaning "Excellent" was printed as a 4-point character, a 5-point character, a 7-point character and a 9-point character with each colored ink on the paper A, the paper B and the paper C. The obtained characters were visually observed and evaluated according to the following criteria. The "A" and "B" of the following criteria were regarded as having no practical problem.

(Criteria)

A: Even 4-point characters were reproduced with even details thereof not damaged.

B: 4-point characters were damaged at details thereof, but 5-point characters were reproduced with no damage.

C: 5-point characters were damaged at details thereof, but 7-point characters were reproduced with no damage.

D: 7-point characters were damaged at details thereof, but 9-point characters were reproduced with no damage.

E: Even 9-point characters were damaged at details thereof.

TABLE I

| PIGMENT DISPERSION No. | PIGMENT DISPERSANT — POLYMER COMPOUND — STRUCTURE | n | WEIGHT AVERAGE MOLECULAR WEIGHT Mw | NUMBER AVERAGE MOLECULAR WEIGHT Mn | CONTENT [parts by mass] | POLYMERIZABLE COMPOUND TRICYCLODECANE DIMETHACRYLATE [parts by mass] | PIGMENT Pigment Red 122 [parts by mass] |
|---|---|---|---|---|---|---|---|
| A | POLYMER COMPOUND A (CONTAINING ε -CAPROLACTAM AND TOLYLENE DIISOCYANATE) | 30 | 11000 | 8000 | 9 | 70 | 20 |
| B | POLYMER COMPOUND A (CONTAINING ε -CAPROLACTAM AND TOLYLENE DIISOCYANATE) | 11 | 4000 | 3000 | 9 | 70 | 20 |
| C | POLYMER COMPOUND A (CONTAINING ε -CAPROLACTAM AND TOLYLENE DIISOCYANATE) | 40 | 16000 | 12000 | 9 | 70 | 20 |
| D | POLYMER COMPOUND B (CONTAINING TOLYLENE DIISOCYANATE) | 30 | 10000 | 8000 | 9 | 70 | 20 |
| E | POLYMER COMPOUND A (CONTAINING ε -CAPROLACTAM AND TOLYLENE DIISOCYANATE) | 30 | 11000 | 8000 | 54 | 70 | 20 |
| F | POLYMER COMPOUND F (NOT CONTAINING CYCLIC STRUCTURE) | 40 | 14000 | 12000 | 9 | 70 | 20 |
| G | POLYMER COMPOUND C (VARIATION OF POLYMER COMPOUND A) | 20 | 10000 | 8000 | 9 | 70 | 20 |
| H | POLYMER COMPOUND D (VARIATION OF POLYMER COMPOUND A) | 20 | 12000 | 10000 | 9 | 70 | 20 |
| I | POLYMER COMPOUND E (VARIATION OF POLYMER COMPOUND A) | 15 | 13000 | 10000 | 9 | 70 | 20 |

TABLE II

| ACTIVE RAY CURABLE INKJET INK COMPONENT | | | INK 1 EXAMPLE | INK 2 EXAMPLE | INK 3 EXAMPLE | INK 4 EXAMPLE |
|---|---|---|---|---|---|---|
| ACTIVE RAY POLYMERIZABLE COMPOUND [parts by mass] | POLYFUNCTIONAL PHOTOPOLYMERIZABLE COMPOUND | TRICYCLODECANE DIMETHANOL DIACRYLATE | 49.8 | 39.8 | 39.8 | 39.8 |
| | | 6EO MODIFIED TRIMETHYLOLPROPANE TRIACRYLATE | 10 | 10 | 10 | 10 |
| | | 4EO MODIFIED PENTAERYTHRITOL TETRAACRYLATE | 10 | 10 | 10 | 10 |
| | | PO MODIFIED NEOPENTYL GLYCOL DIACRYLATE | 10 | 10 | 10 | 10 |
| | | 3PO MODIFIED TRIMETHYLOLPROPANE TRIACRYLATE | — | — | 10 | — |
| | | 3-METHYLPENTANEDIOL DIACRYLATE | — | 10 | — | 10 |
| | | 2-(2-VINYLOXYETHOXY) ETHYL ACRYLATE | — | — | — | — |
| PHOTOPOLYMERIZATION INITIATOR [parts by mass] | ACYLPHOSPHINE-BASED COMPOUND | DAROCURE TPO | 5 | 5 | 5 | 5 |
| GELLING AGENT [parts by mass] | | STEARYL STEARATE | 2.5 | 2.5 | 2.5 | 2.5 |
| | | DISTEARYL KETONE | 2.5 | 2.5 | 2.5 | 2.5 |
| | | ICOSYL ICOSANOATE | | | | |
| | | DILAURYL KETONE | | | | |

TABLE II-continued

| ACTIVE RAY CURABLE INKJET INK COMPONENT | | INK 1 EXAM-PLE | INK 2 EXAM-PLE | INK 3 EXAM-PLE | INK 4 EXAM-PLE |
|---|---|---|---|---|---|
| PIGMENT DISPERSION [parts by mass] | PIGMENT DISPERSION A | 10 | — | — | — |
| | PIGMENT DISPERSION B | — | 10 | — | — |
| | PIGMENT DISPERSION C | — | — | 10 | — |
| | PIGMENT DISPERSION D | — | — | — | 10 |
| | PIGMENT DISPERSION E | — | — | — | — |
| | PIGMENT DISPERSION F | — | — | — | — |
| | PIGMENT DISPERSION G | — | — | — | — |
| | PIGMENT DISPERSION H | — | — | — | — |
| | PIGMENT DISPERSION I | — | — | — | — |
| POLYMERIZATION INHIBITOR [parts by mass] | Irgastab UV10 | 0.1 | 0.1 | 0.1 | 0.1 |
| SURFACTANT [parts by mass] | KF-352 | 0.1 | 0.1 | 0.1 | 0.1 |
| CONTENT OF POLYMER COMPOUND IN INK [parts by mass] | | 3 | 3 | 3 | 3 |
| EVALUATION | BLOOMING | AA | A | A | A |
| | CHARACTER QUALITY | A | A | A | A |

TABLE III

| ACTIVE RAY CURABLE INKJET INK COMPONENT | | | INK 5 EXAM-PLE | INK 6 EXAM-PLE | INK 7 EXAM-PLE | INK 8 EXAM-PLE |
|---|---|---|---|---|---|---|
| ACTIVE RAY POLYMERIZABLE COMPOUND [parts by mass] | POLYFUNCTIONAL PHOTOPOLYMERIZABLE COMPOUND | TRICYCLODECANE DIMETHANOL DIACRYLATE | 49.8 | 49.8 | 49.8 | 49.8 |
| | | 6EO MODIFIED TRIMETHYLOLPROPANE TRIACRYLATE | 10 | 10 | 10 | 10 |
| | | 4EO MODIFIED PENTAERYTHRITOL TETRAACRYLATE | 10 | 10 | 10 | 10 |
| | | PO MODIFIED NEOPENTYL GLYCOL DIACRYLATE | 10 | 10 | 10 | 10 |
| | | 3PO MODIFIED TRIMETHYLOLPROPANE TRIACRYLATE | — | — | — | — |
| | | 3-METHYLPENTANEDIOL DIACRYLATE | — | — | — | — |
| | | 2-(2-VINYLOXYETHOXY) ETHYL ACRYLATE | — | — | — | — |
| PHOTOPOLYMERIZATION INITIATOR [parts by mass] | ACYLPHOSPHINE-BASED COMPOUND | DAROCURE TPO | 5 | 5 | 5 | 5 |
| GELLING AGENT [parts by mass] | | STEARYL STEARATE | 2.5 | 2.5 | 2.5 | 2.5 |
| | | DISTEARYL KETONE | 2.5 | 2.5 | 2.5 | 2.5 |
| | | ICOSYL ICOSANOATE | | | | |
| | | DILAURYL KETONE | | | | |
| PIGMENT DISPERSION [parts by mass] | | PIGMENT DISPERSION A | — | — | — | — |
| | | PIGMENT DISPERSION B | — | — | — | — |
| | | PIGMENT DISPERSION C | — | — | — | — |
| | | PIGMENT DISPERSION D | — | — | — | — |
| | | PIGMENT DISPERSION E | 10 | — | — | — |
| | | PIGMENT DISPERSION F | — | — | — | — |
| | | PIGMENT DISPERSION G | — | 10 | — | — |
| | | PIGMENT DISPERSION H | — | — | 10 | — |
| | | PIGMENT DISPERSION I | — | — | — | 10 |
| POLYMERIZATION INHIBITOR [parts by mass] | | Irgastab UV10 | 0.1 | 0.1 | 0.1 | 0.1 |
| SURFACTANT [parts by mass] | | KF-352 | 0.1 | 0.1 | 0.1 | 0.1 |
| CONTENT OF POLYMER COMPOUND IN INK [parts by mass] | | | 3 | 3 | 3 | 3 |
| EVALUATION | | BLOOMING | AA | AA | AA | A |
| | | CHARACTER QUALITY | A | A | A | A |

TABLE IV

| ACTIVE RAY CURABLE INKJET INK COMPONENT | | | INK 9 EXAMPLE | INK 10 COMPARATIVE EXAMPLE | INK 11 COMPARATIVE EXAMPLE | INK 12 COMPARATIVE EXAMPLE |
|---|---|---|---|---|---|---|
| ACTIVE RAY POLYMERIZABLE COMPOUND [parts by mass] | POLYFUNCTIONAL PHOTOPOLYMERIZABLE COMPOUND | TRICYCLODECANE DIMETHANOL DIACRYLATE | 49.8 | 39.8 | 39.8 | 39.8 |
| | | GEO MODIFIED TRIMETHYLOLPROPANE TRIACRYLATE | 10 | 10 | 10 | 10 |
| | | 4EO MODIFIED PENTAERYTHRITOL TETRAACRYLATE | 10 | 10 | 10 | 10 |
| | | PO MODIFIED NEOPENTYL GLYCOL DIACRYLATE | 10 | 10 | — | — |
| | | 3PO MODIFIED TRIMETHYLOLPROPANE TRIACRYLATE | — | — | — | — |
| | | 3-METHYLPENTANEDIOL DIACRYLATE | — | 5 | 5 | 5 |
| | | 2-(2-VINYLOXYETHOXY) ETHYL ACRYLATE | — | 5 | 5 | 5 |
| PHOTOPOLYMERIZATION INITIATOR [parts by mass] | ACYLPHOSPHINE-BASED COMPOUND | DAROCURE TPO | 5 | 5 | 5 | 5 |
| GELLING AGENT [parts by mass] | | STEARYL STEARATE | | 2.5 | 2.5 | |
| | | DISTEARYL KETONE | | 2.5 | 2.5 | |
| | | ICOSYL ICOSANOATE | 2.5 | | | |
| | | DILAURYL KETONE | 2.5 | | | |
| PIGMENT DISPERSION [parts by mass] | | PIGMENT DISPERSION A | 10 | — | — | — |
| | | PIGMENT DISPERSION B | — | — | — | — |
| | | PIGMENT DISPERSION C | — | — | — | — |
| | | PIGMENT DISPERSION D | — | — | — | — |
| | | PIGMENT DISPERSION E | — | — | — | — |
| | | PIGMENT DISPERSION F | — | 10 | 10 | 10 |
| | | PIGMENT DISPERSION G | — | — | — | — |
| | | PIGMENT DISPERSION H | — | — | — | — |
| | | PIGMENT DISPERSION I | | | | |
| POLYMERIZATION INHIBITOR [parts by mass] | | Irgastab UV10 | 0.1 | 0.1 | 0.1 | 0.1 |
| SURFACTANT [parts by mass] | | KF-352 | 0.1 | 0.1 | 0.1 | 0.1 |
| CONTENT OF POLYMER COMPOUND IN INK [parts by mass] | | | 3 | 3 | 3 | 3 |
| EVALUATION | | BLOOMING | AA | B | B | AA |
| | | CHARACTER QUALITY | B | A | A | E |

As shown in the above results, it is recognized that the ink of the present invention can suppress occurrence of blooming and have excellent image definition as compared with the ink of Comparative Examples.

Although embodiments of the present invention have been described and illustrated in detail, the disclosed embodiments are made for purposes of illustration and example only and not limitation. The scope of the present invention should be interpreted by terms of the appended claims.

The entire disclosure of Japanese Patent Application No. 2023-100416, filed on Jun. 20, 2023, including description, claims, drawings and abstract is incorporated herein by reference.

What is claimed is:

1. An active ray curable inkjet ink comprising:
an active ray polymerizable compound;
a photopolymerization initiator;
a polymer compound; and
a gelling agent,
wherein the polymer compound has a tolylene diisocyanate structure.

2. The active ray curable inkjet ink according to claim 1, wherein the polymer compound is a polymer compound having an ε-caprolactam structure.

3. The active ray curable inkjet ink according to claim 1, wherein a content of the polymer compound is greater than 0 mass % and equal to or less than 5 mass %.

4. The active ray curable inkjet ink according to claim 1, wherein a weight average molecular weight Mw of the polymer compound is in a range of 5,000 to 15,000.

5. The active ray curable inkjet ink according to claim 1, wherein a number average molecular weight Mn of the polymer compound is in a range of 5,000 to 10,000.

6. The active ray curable inkjet ink according to claim 1, further comprising a pigment.

7. The active ray curable inkjet ink according to claim 1, wherein the gelling agent includes an aliphatic ketone compound and/or an aliphatic ester compound.

* * * * *